(12) United States Patent
Qi et al.

(10) Patent No.: US 9,475,040 B2
(45) Date of Patent: Oct. 25, 2016

(54) SYNTHESIS OF CU/SAPO-34 WITH VARIABLE COPPER LOADINGS

(71) Applicant: GM Global Technology Operations LLC, Detroit, MI (US)

(72) Inventors: Gongshin Qi, Troy, MI (US); Wei Li, Troy, MI (US); Xiangju Meng, Hangzhou (CN); Fengshou Xiao, Hangzhou (CN)

(73) Assignee: GM Global Technology Operations LLC, Detroit, MI (US)

( * ) Notice: Subject to any disclaimer, the term of this patent is extended or adjusted under 35 U.S.C. 154(b) by 866 days.

(21) Appl. No.: 13/709,137

(22) Filed: Dec. 10, 2012

(65) Prior Publication Data

US 2014/0161718 A1 Jun. 12, 2014

(51) Int. Cl.
| | | |
|---|---|---|
| C01B 39/54 | (2006.01) | |
| B01J 29/85 | (2006.01) | |
| B01D 53/94 | (2006.01) | |
| B01J 35/00 | (2006.01) | |

(52) U.S. Cl.
CPC ............ B01J 29/85 (2013.01); B01D 53/9418 (2013.01); C01B 39/54 (2013.01); B01D 2255/20761 (2013.01); B01D 2255/50 (2013.01); B01D 2258/012 (2013.01); B01J 35/002 (2013.01); B01J 2229/183 (2013.01); Y02T 10/24 (2013.01)

(58) Field of Classification Search
CPC .... C01B 39/54; B01J 29/85; B01J 2229/183
See application file for complete search history.

(56) References Cited

U.S. PATENT DOCUMENTS

| | | | |
|---|---|---|---|
| 4,440,871 A | 4/1984 | Lok et al. | |
| 2004/0244673 A1* | 12/2004 | Yates et al. | 117/2 |
| 2008/0293990 A1* | 11/2008 | Stevenson et al. | 585/500 |
| 2010/0310440 A1* | 12/2010 | Bull et al. | 423/239.1 |
| 2013/0266785 A1* | 10/2013 | Chen | B01J 20/18 428/219 |
| 2013/0324778 A1* | 12/2013 | Mitchell et al. | 585/417 |
| 2014/0161718 A1* | 6/2014 | Qi | B01D 53/9418 423/708 |
| 2015/0110711 A1* | 4/2015 | Franco | B01J 29/85 423/703 |
| 2015/0203417 A1* | 7/2015 | Tian | C10G 3/45 585/733 |
| 2015/0218007 A1* | 8/2015 | Chen | B01J 20/18 428/402 |
| 2015/0299549 A1* | 10/2015 | Ueda | C09K 5/063 220/592.2 |

FOREIGN PATENT DOCUMENTS

WO 2013159828 A1 10/2013

OTHER PUBLICATIONS

Upakul Deka et al; Changing active sites in Cu-CHA catalysts: deNOx selectivity as a function of the preparation method; Microporous and Mesoporous Materials, vol. 166, 2013, 144-152.

* cited by examiner

*Primary Examiner* — David M Brunsman
(74) *Attorney, Agent, or Firm* — Reising Ethington P.C.

(57) ABSTRACT

A Cu-amine complex of hydrated copper sulfate and ethylene diamine or an oligomer of ethylene diamine is employed in a direct (one-pot) synthesis of a copper-cation containing silicoaluminophosphate (SAPO) zeolite material having the Cu/SAPO-34 structure. The copper-amine complex is included in an aqueous gel of precursors of the $SiO_2$, $Al_2O_3$, and $P_2O_5$ constituents, which are mixed, aged, and thermally treated to form the desired Cu/SAPO-34 structure. The synthesized Cu/SAPO-34 material is demonstrated to be an effective catalyst material in conversion of nitric oxide to nitrogen (using ammonia as a reductant) in synthetic exhaust streams characteristic of diesel engine and other lean-burn vehicle engine exhaust streams.

20 Claims, 2 Drawing Sheets

SYNTHESIS OF CU/SAPO-34 WITH VARIABLE COPPER LOADINGS

TECHNICAL FIELD

This disclosure pertains to a one-pot synthesis of silicoaluminophosphate (SAPO) compositions having a SAPO-34 crystal structure with copper cations enclosed within the crystal structure. In other words, copper cations ($Cu^{2+}$) are contained and bound within the SAPO-34 crystal structure as the silicoaluminophosphate crystal structure is formed. In accordance with the one-pot synthesis, the quantity of copper cations in the resulting Cu/SAPO-34 crystal may be varied.

BACKGROUND OF THE INVENTION

The text in this background section of the specification is intended to provide understanding of the background of the invention without regard to what may be prior art with respect to the invention. There is no intention to specify what is prior art in presenting this background material.

Zeolites are natural or synthetic hydrated aluminosilicates with an open three-dimensional crystal structure in which water molecules are held in cavities in the crystal lattice. The water can be driven off by heating the crystalline material and the dried zeolite crystal structure can then absorb other molecules of suitable size. Zeolites, with their unique porosity and high surface area, have been widely used in many industrial technologies, including gas adsorption, ion exchange, separation of constituents in fluids, and in catalysis. For this reason they are often called molecular sieves. But, thus far, aluminosilicate molecular sieves have not been usable in the treatment of exhaust gas constituents (CO, HC, and NOx) flowing from a vehicle internal combustion engine. Aluminophosphate molecular sieves also exist in wide crystal structural diversity, but are of limited value in catalysis due to their low acidity and the lack of chemical reduction-oxidation (redox) properties.

More recently, silicoaluminophosphate (SAPO) analogs of aluminophosphate molecular sieves, synthesized by introducing Si (or silica) in place of a portion of the phosphate, have been adapted to provide catalytic properties for acidic and redox catalysis. These silicoaluminophosphate compositions can be formed into different complex crystal structures (SAPO-n), defined by varying proportions of tetrahedral oxides of $SiO_2$, $AlO_2^-$, and $PO_2^+$, where n denotes a particular framework type. The different crystal structures are each characterized by several interconnected cage-like structures with openings that are smaller than the boundaries of the apparent cage surfaces. Negative charges occur within SAPO frameworks when there are more aluminum atoms than phosphorus atoms within the framework. These negative charges are typically balanced by $H^+$ cations (i.e., positively charged ions) as the SAPO materials are synthesized and calcined; this form is usually referred to as H/SAPO-n.

H-SAPO-n materials are often prepared through hydrothermal crystallization processing of suitable proportions of water-dispersible precursors of $SiO_2$, $Al_2O_3$, and $P_2O_5$, which yields the negatively-charged crystal structure, defined by arranged Si, Al, P, and O atoms with sufficient $H^+$ cations for a neutral powder product. A structure directing agent, such as an amine or ammonium compound, may be added to the precursors and ultimately decomposed during the thermal processing. It is found that, based on the proportions of the respective four atomic constituents and the structure directing agent; several different silicoaluminophosphate crystal structures may be formed. As stated, they are designated with numbers (SAPO-n) and present different sized cages and openings. In some applications it is desired to replace the hydrogen cations with cations of a metal (M) in one or more subsequent processing steps. And such metal-cation containing SAPOs are often designated as M/SAPO-n.

Of the several different M/SAPO-n crystal structures, Cu/SAPO-34 is of interest as a potential catalyst material in the selective catalytic reduction of NOx with ammonia in the exhaust of diesel engines, or lean-burn gasoline engines, on motor vehicles. SAPO-34 has a crystal structure like that of its naturally occurring aluminosilicate analog, Chabazite, $Ca_2[(AlO_2)_4(SiO_2)_8]\cdot 13H_2O$. But the multi-step process of forming SAPO-34 and subsequently replacing its $H^+$ cations with cations of a transition metal, like copper, is expensive. Further, there has been no easy way of controlling the amount of copper cation loading through the small pore openings in the H/SAPO-34 structure. There is a need for a process of forming Cu/SAPO-34 or other M/SAPO-34 materials without having to insert the metal cations into a previously formed H/SAPO-34 caged crystalline structure.

SUMMARY OF THE INVENTION

In accordance with practices of this invention, a suitable water-dispersible complex of an ethylene diamine (or a dimer, trimer or tetramer of ethylene diamine) and a copper salt, preferably a $Cu^{2+}$ salt, is prepared prior to mixing, or during mixing with suitable proportions of water-dispersible precursors of $SiO_2$, $Al_2O_3$, and of $P_2O_5$, and water for hydrothermal processing of the mixture to form Cu/SAPO-34 from the mixture of the reactants. An additional water dispersible amine or ammonium compound may be added to the aqueous mixture as a suitable structure directing agent (SDA) for the SAPO-34 crystal structure. But the ethylene diamine (or ethylene diamine oligomer)-copper complex also serves this purpose. Specific precursor materials, timing of additions, mixing procedures, and other processing parameters will be described in more detail in this specification.

The combination of the amine-complexed copper compound, silicon oxide material, phosphorus oxide material, aluminum oxide material, SDA amine, and water is vigorously and thoroughly mixed over a suitable period of hours to form an aqueous gel. The gel is then heated (at, for example, about 180° C.) over a period of hours to gradually remove water, and to decompose amine complex-forming material and crystal structure directing agent material, and to thus form the silicoaluminophosphate structure, characteristic of SAPO-34. But the SAPO-34 structure already contains a suitable (and adjustable or variable) proportion of copper cations within its anionic multiple interconnected cage-like crystal structure and is, appropriately, Cu/SAPO-34. The final product may be filtered from any residual water and extraneous materials such as starting materials, washed in deionized water (if necessary) or with an ammonium salt to remove unattached copper ions (if necessary), and dried and calcined. The calcined material may be ground or pulverized to a powder of suitable particle size for use, for example, in a catalytic reduction treatment of a NOx-containing exhaust stream from a vehicle engine using ammonia as the reductant ($NH_3$-based Selective Catalytic Reduction). The molar ratio of silicon, aluminum, and phosphorus (based on one mole of aluminum) in the copper-containing SAPO-34 composition is Si/Al/P=0.35-0.40/1/

0.60-0.65. The molar ratio of copper to aluminum in our synthesized Cu/SAPO-34 may be varied over the range 0.07-0.36.

By way of illustrative examples, a complex of tetraethylene pentamine (TEPA, a tetramer of ethylene diamine) may be formed with penta-hydrated copper sulfate ($CuSO_4 \cdot 5H_2O$) as the material for incorporating copper into the precursor gel leading to synthesis of the crystal structure for Cu/SAPO-34. Variation in the amount of the Cu-TEPA complex may be used to vary the amount of copper cations in the synthesized Cu/SAPO-34 crystalline product. And propyl amine may be used to adjust the pH of the gel to a neutral or slightly basic condition (pH=7-9). The propyl amine may also serve as a suitable co-template SDA used in the gel in combination with suitable proportions of the $SiO_2$, $Al_2O_3$, and $P_2O_5$ precursors for assisting formation of the SAPO-34 crystal structure. The copper salt and TEPA amine complex is found to be compatible with silicon oxide, aluminum oxide, and phosphorus oxide precursors in the above-described hydrothermal process for forming the SAPO-34 crystal structure with in-situ placed copper cations.

Other objects and advantages of the invention will be apparent from the following detailed descriptions of illustrative embodiments of the preparation of Cu/SAPO-34.

DESCRIPTION OF PREFERRED EMBODIMENTS

Figure 1:
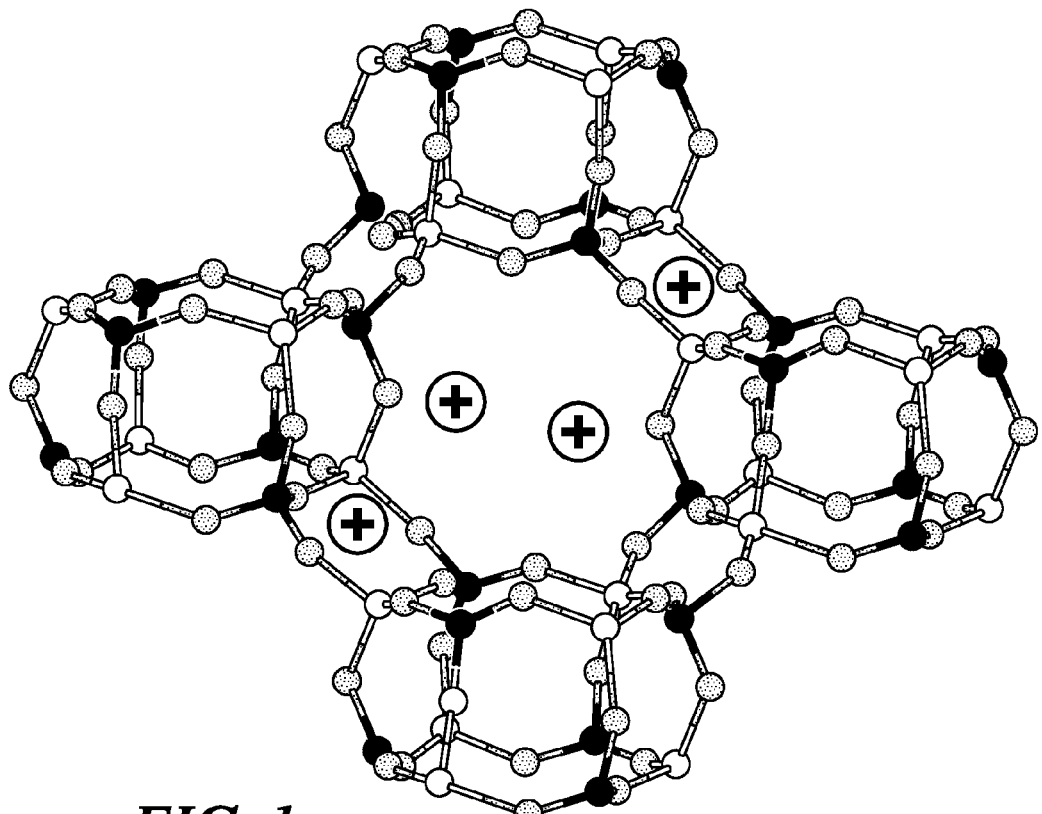
FIG. 1 is a schematic illustration of the crystal structure of Cu/SAPO-34. Aluminum atoms are represented by unfilled circles, silicon and phosphorus atoms are represented by dark-filed circles, and oxygen atoms are represented by dot-filled circles. The Cu/SAPO-34 crystal structure contains dispersed negative charges in the structure which are not illustrated in the figure. $Cu^{2+}$ cations are represented by relatively larger circles with a plus-sign (+) in them. The copper atoms are held by electrostatic attraction within the crystal structure.

In illustrative embodiments of the invention, silicoaluminophosphate molecular sieve compositions were synthesized in the form of SAPO-34 crystal structures, and containing seven different amounts of copper in the as-formed crystal structures. These seven different compositions are referred to as Cu/SAPO-34-a-g, respectively. Each of these Cu/SAPO-34 compositions was prepared using a complex of hydrated cupric sulfate ($CuSO_4 \cdot 5H_2O$) formed with an equal molar amount of tetraethylenepentamine (having the chemical equation: $NH_2-CH_2-CH_2-NH-CH_2-CH_2-NH-CH_2-CH_2-NH-CH_2-CH_2-NH_2$). This complex is sometimes referred to as Cu-TEPA in this specification. The copper amine complex serves a combined function of providing a template for the resulting Cu/SAPO-34 structure and for placing copper cations within the structure as it is being formed. Propyl amine ($CH_3-CH_2-CH_2-NH_2$, sometimes PA) was used to adjust the pH of an aqueous gel of precursor materials to values in the range of 7-9 (neutral to slightly basic). The propyl amine may have also served as a co-template or structure directing agent in forming the six different Cu/SAPO-34 samples a-g.

Other water soluble copper salts, such as cupric nitrate, cupric acetate, and cupric chloride may be used (alone or in combinations) in the preparation of Cu/SAPO-34 by the method of this invention. And in the formation of suitable amine-copper complexes, ethylene diamine, diethylene triamine, and triethylene tetraamine may be used, alone or in combination in forming the equal-molar complex with copper. In general, a linear amine with one or more ethylene groups and with intervening amine groups (—NH—) and two terminal amine groups (—$NH_2$) is preferred.

Returning to the preparation of the Cu/SAPO-34-a-g samples, the molar chemical composition of the precursor ingredients of the starting gels and the corresponding products (Cu/SAPO-34-a-g) are given in the following Table 1. The copper cation content of the respective products is expressed as weight percent of copper in the product. And the BET surface area ($m^2/g$) of the powdered products is presented.

TABLE 1

Starting Gel Composition, Cu content and BET in the Calcined Cu/SAPO-34 Products

| Samples | Composition of the gel, $Al_2O_3/P_2O_5/SiO_2/H_2O/Cu$-TEPA/PA | Cu in the product (wt %, by ICP) | BET ($m^2/g$) |
|---|---|---|---|
| Cu/SAPO-34-a | 1/1.14/0.57/76.22/0.040/3.38 | 2.19 | 502 |
| Cu/SAPO-34-b | 1/1.14/0.57/76.42/0.080/3.38 | 3.86 | 484 |

TABLE 1-continued

Starting Gel Composition, Cu content and BET in the Calcined Cu/SAPO-34 Products

| Samples | Composition of the gel, $Al_2O_3/P_2O_5/SiO_2/H_2O/Cu$-TEPA/PA | Cu in the product (wt %, by ICP) | BET ($m^2/g$) |
|---|---|---|---|
| Cu/SAPO-34-c | 1/1.14/0.57/76.60/0.114/3.38 | 4.23 | 499 |
| Cu/SAPO-34-d | 1/1.14/0.57/77.17/0.228/3.38 | 5.30 | 437 |
| Cu/SAPO-34-e | 1/1.14/0.57/77.74/0.343/3.38 | 8.95 | 506 |
| Cu/SAPO-34-f | 1/1.14/0.57/77.74/0.457/3.38 | 9.45 | 440 |
| Cu/SAPO-34-g | 1/1.14/0.57/77.74/0.571/3.38 | 10.05 | 437 |

The relative starting material proportions of about 1 mole $Al_2O_3$, about 1.14 moles $P_2O_5$, and about 0.57 mole $SiO_2$ are important to the formation of the SAPO-34 crystal structure. A suitable amount of water (suitably about 76-78 moles of water per mole of $Al_2O_3$) is used as the liquid medium for gel formation. The amount of the tetraethylene pentaamine-copper complex is adjusted for a suitable copper cation content. And the propyl amine or other suitable base material is used to adjust the pH of the aqueous gel for formation of the Cu/SAPO-34 structure. As stated above, the Cu/SAPO-34 product structure is characterized by compositional molar proportions of 0.35-0.40 mole of silicon per mole of aluminum, 0.6-0.65 mole of phosphorus per mole of aluminum, and about 0.07-0.36 mole copper per mole of aluminum.

In the respective syntheses of the a-g Cu/SAPO-34 structures, phosphoric acid ($H_3PO_4$) was used as the precursor for the $P_2O_5$ constituent in the compositions, AlOOH (boehmite) for the $Al_2O_3$ constituent, and $SiO_2$ (silica sol) for itself. Other precursor materials compatible with the formation of the gel may be used, such as pseudoboehmite for alumina, as well as other silica and phosphorus oxide precursors.

As a typical run for the synthesis of Cu/SAPO-34, phosphoric acid ($H_3PO_4$, 1.09 ml) and AlOOH (boehmite, 1.02 g) were added in water (9.0 g). Then, silicon dioxide (0.24 g, as silica sol) was added to this gel. After one hour stirring, $CuSO_4.5H_2O$ (0.07 g) was added to the above gel, followed by adding TEPA (0.05 g). In other embodiments, the copper salt and ethylene diamine complex may be formed before they are added to the aqueous gel mixture. After one hour, PA (propylamine, 1.4 g) was added in the above gel, drop wise with vigorous stirring to achieve a pH in the range of 7-9. After being stirred at ambient temperature for twelve hours, the final gel was transferred to a Teflon-lined stainless steel autoclave and heated at 180° C. for 2 days. The product was collected by filtration, washed with de-ionized water to remove extraneous material, and dried in air at 80° C. for 24 hours. Each solid Cu/SAPO-34 sample was broken up into a powder and washed with ammonium nitrate ($NH_4NO_3$) to remove any unattached or unbonded copper cations to avoid formation of copper oxide particles during the subsequent calcinations. The washed solid a-g materials were then calcined at 550° C. for 4 h.

FIG. 1 is a schematic illustration of the crystal structure of Cu/SAPO-34. The proportions and arrangement of the silicon, aluminum, phosphorus, and oxygen atoms in the complex crystal structure are illustrated in this schematic representation. It is seen that the structure has a relatively large central cage-like structure with integrally attached smaller outer cages that share apparent wall surfaces with the central cage. The cage-like crystal structure is anionic and the copper cations are electrostatically secured to the anionic crystal structure. To the extent that the content of copper cations does not balance the negative charge of the anionic structure, it is believed that protons serve that need.

For purposes of comparison, an ion exchanged Cu/SAPO-34 was prepared by a two-step liquid ion-exchange method (LPIE). A commercial H/SAPO-34 powder (Noble, Al:Si:P=1:0.1:0.9, obtained by inductively coupled plasma and atomic emission spectrometry) was ion exchanged using an ammonium nitrate ($NH_4NO_3$, Alpha Aesar, >95%) solution at 80° C. for one hour to obtain the $NH_4^+$ form. Then the solid was filtered and washed with distilled water. The $NH_4^+$/SAPO-34 was dried at 100° C. for 16 hours before repeating the ammonium exchange process for a total of two exchanges. Cu ion exchange was performed by mixing the $NH_4^+$/SAPO-34 with a $Cu(CH_3COO)_2$ (Riedel de Haën, >99%) solution (0.05 mol/L) at ambient temperature for six hours. After the powder was filtered and washed with distilled water, it was dried at 100° C. for 16 hours and calcined at 550° C. for 4 hours. This sample may sometimes hereinafter be denoted as "CuE", where E stands for the exchange method.

In accordance with this invention, it was found that by adjusting the copper-amine composition of the starting gels, Cu/SAPO-34 samples were successfully synthesized with various Cu loadings by the described one-pot synthesis. The compositional results are presented in the above Table 1. During the synthesis, the Cu-TEPA/$Al_2O_3$ molar ratio was between 0.04-0.571 to obtain the variation in copper cation content in the Cu/SAPO-34 crystals. The adjusting of the propyl amine/$Al_2O_3$ ratio was important; the amount of the propyl amine can affect the pH of the starting gels. Preferably the pH of our gels is in the range of about 7-9. If the pH is much higher, aluminophosphate-B as an impurity is produced and, on the other hand, very low pH leads to the formation of an amorphous aluminophosphate phase.

The synthesized samples of Cu/SAPO-34 a-g were analyzed and characterized as follows.

Figure 4:
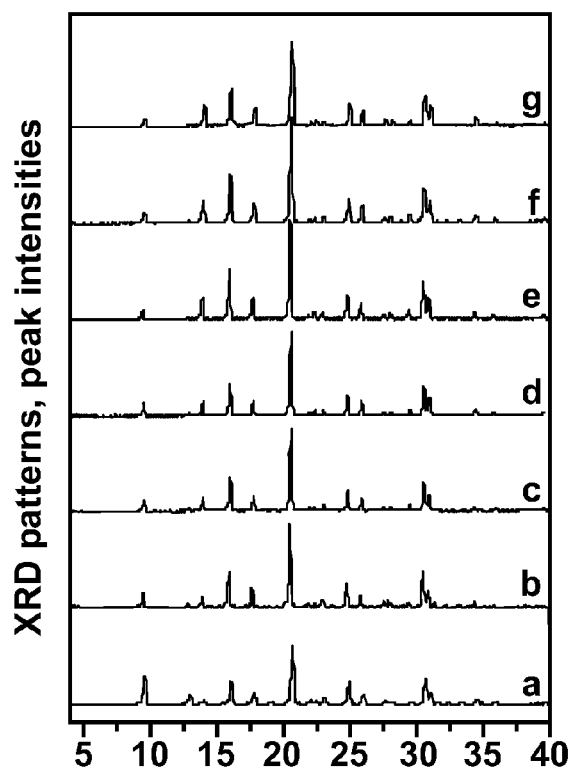
FIG. 4 comprises seven X-ray diffraction patterns (a-g), over 2Θ angles, aligned one above another, of the seven Cu/SAPO-34 catalysts a-g, prepared as described in the following section of this specification.

X-ray diffraction (XRD) data was collected on a Rigaku D/MAX 2550 diffractometer with Cu Kα (λ=1.5418 Å) radiation (40 kV, 200 mA). The step size was 0.02°, and the scanning speed was 12°/min. XRD patterns for the Cu/SAPO-34 samples a-g are presented in FIG. 4.

The copper content of the seven different Cu-SAPO-34 a-g compositions were determined by inductively coupled plasma (ICP) analysis (Perkin-Elmer 3300 DV). These values are presented as weight percent of copper in Table 1.

The morphology of the samples was observed with a field emission scanning electron microscope (JEOS JSM 6700F). Surface area and pore volume of the samples were measured by nitrogen adsorption-desorption isotherms at 77K using a Micromeritics ASAP 2020M system. FTIR spectra were recorded using a Bruker 66V FTIR spectrometer. DTA-TG analysis was carried out a NETZSCH STA 449C in air at a heating rate of 10 K/min from room temperature to 900° C. UV-Vis spectra were measured on a Perkin-Elmer Lambda 20 spectrophotometer. The temperature-programmed desorption of ammonia ($NH_3$-TPD) was performed on a Micromertritics AutoChem II 2920 automated chemisorption analysis at a heating rate of 10° C./min from 120° C. to 800° C. under helium flow. $H_2$-temperature-programmed reduction ($H_2$-TPR) was performed on a Micrometritics AutoChem II 2920 automated chemisorption analysis unit with a TCD in 10% $H_2$-90% Ar flow of 40 ml/min by heating the catalyst from 35° C. with a heating rate of 10° C./min and holding it at the desired final temperature for 1 h.

As stated, XRD patterns of the as-synthesized Cu/SAPO-34-a-g samples with different contents of Cu were carefully prepared. These patterns are presented in FIG. 4. Characteristic diffraction peaks for each of the Cu/SAPO-34 samples were obtained at 2θ=9.5°, 15.96°, 17.92°, 20.05°, 25.82°, 30.92°, and 31.2°. This pattern of seven diffraction peaks confirmed the formation of Cu/SAPO-34. The intensity of the peaks also showed that each of the Cu/SAPO-34-a-g samples had good crystallinity. It should be noted that no characteristic peaks of the CuO (35.6° and 38.8°) phase and the $Cu_2O$ (36.44°) phase were found to be present in the several Cu/SAPO-34 samples.

SEM images of each of the Cu/SAPO-34 a-g samples were prepared. The SEM images clearly showed that the morphologies of the seven different copper content samples were the same as that of chabazite. Cu/SAPO-34 samples were composed of regular cubic crystals with sizes of about 10 μm. The SEM images also confirmed that each of the synthesized Cu/SAPO-34 samples have high crystallinity.

The amount of loading and the degree of active component adhesion are important factors for the activity of a catalyst. Each of the synthesized Cu/SAPO-34 samples was blue, which indicated that copper cations existed in the samples. The elemental analysis by ICP technique showed that the Cu loading in the Cu/SAPO-34 samples was as high as 2.19-10.05 wt % (Table 1), which was much higher than that (0.91 wt %) obtained in Cu/SAPO-34-ion exchanged prepared by the described aqueous $Cu^{2+}$ ion exchange method. It is noteworthy that even with high Cu content, neither CuO nor $Cu_2O$ phases were found in the Cu/SAPO-34 samples. This further confirms that the copper species were highly dispersed in the micropores of the Cu/SAPO/34 zeolites. The Cu loading in the Cu/SAPO-34 samples was adjusted in the range of 2.19-10.05 wt % by adjusting the copper-amine composition of the starting gels. These results indicated catalytically active components could be easily introduced and their amounts varied and controlled in the synthesis of zeolites by the use of the metal-complex templates.

The UV-Vis spectrum of as-synthesized Cu/SAPO-34-c was obtained. For comparison, the like spectrum of a Cu-TEPA complex solution was measured. Cu/SAPO-34-c exhibited a wide band at 265 nm, which was almost the same as that (268 nm) of Cu-TEPA in the solution. These results suggested that the Cu-TEPA complex was retained inside the Cu/SAPO-34-c zeolite. After washing with $NH_4^+$ ions to remove unattached copper cations and calcination, Cu-SAPO-34-c showed one main peak at 234 nm, which was assigned to a highly dispersed $Cu^{2+}$ species. The synthesis temperature of Cu/SAPO-34 is at 180° C. The high reaction temperature could lead to the decomposition of the Cu-TEPA complex in the synthesis. So Cu/SAPO-34-c exhibited another wide bond at 600 nm, which was due to the decomposition of the Cu-TEPA complex.

Table 1 shows the BET determined surface areas of the calcined Cu/SAPO-34 a-g samples. These samples had BET surface areas of 437-506 m²/g, which was lower than that (600 m²/g) of a SAPO-34 zeolite. These results suggested that the copper species were highly dispersed in the micropores of the Cu/SAPO-34 zeolites, which leads to some blockage of the channels of the samples.

Thus, it is seen that the subject direct route for introducing $Cu^{2+}$ species into the SAPO zeolites used here greatly enhances the efficiency of forming such Cu/SAPO-34 crystalline materials and of forming them with different amounts of the copper cations in the cage-like crystal structures.

We have found that our Cu/SAPO-34 zeolite materials provide copper cations in a crystal structure that provides excellent catalytic activity for the selective catalytic reduction (SCR) of nitrogen oxides (NO and $NO_2$, collectively $NO_x$) by $NH_3$. The exhaust gas streams leaving the exhaust manifolds of vehicle diesel engines and other-lean burn engines contain NOx in amounts that are required to be chemically reduced to nitrogen and water before the exhaust stream leaves the tailpipe of the vehicle. In widely used practices for NOx reduction, an aqueous urea solution is added to the hot exhaust stream. Ammonia is formed in the exhaust stream and the exhaust is passed over a suitable catalyst for the ammonia-based, selective catalytic reduction of the NOx.

Samples of the Cu/SAPO-34-a (2.19 wt. % Cu), -c (4.23 wt. % Cu), -e (8.95 wt. % Cu), and -g (10.09 wt. % Cu) materials, prepared by the subject one-pot synthesis as described above, were selected for testing of their respective activities in the conversion of NO to $N_2$, using ammonia as the reductant, over a temperature range from 150° C. to 600° C. Catalytic activity measurements for ammonia-SCR under temperature ramping conditions were carried out in a tube reactor (d=6 mm; L=36 mm). The catalysts (500 mg) were diluted 1:9 with quartz powder and placed in the middle of the reactor with clogs of quartz wool. Prior to the reaction, the catalyst was pretreated in 5% $O_2/N_2$ (1.0 L/min) at 500° C. for 1 hour. After cooling to 80° C. in nitrogen, the gas flow was switched to 500 ml/min of 500 ppm $NH_3$, 500 ppm NO, 5% $O_2$, with the balance nitrogen. The temperature was increased by 10° C./min from 80° C. to 600° C. As the synthetic exhaust gas composition was passed in a continuous flow stream over the heated catalyst material at a constant space velocity of about 35,000 $h^{-1}$, chemical analysis of the outlet gas stream by FTIR revealed that much of the NO in the inlet stream was converted to nitrogen and water by reaction with ammonia in the stream.

Figure 3:
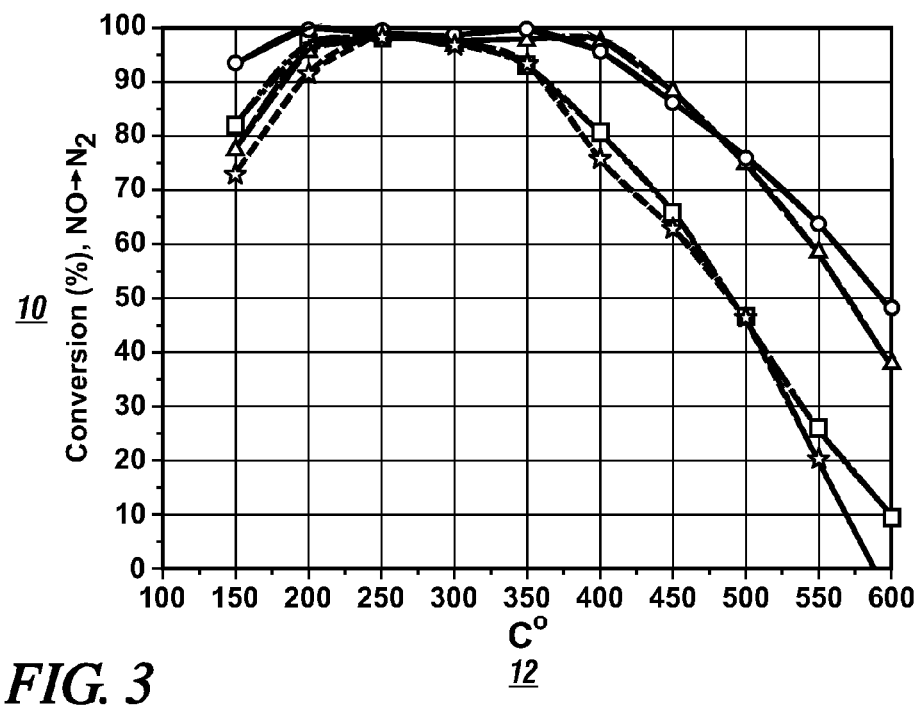
FIG. 3 is a graph of percent conversion of NO to $N_2$ (vertical axis, 10) obtained when a synthetic exhaust gas stream composed of NO, $NH_3$, $O_2$, $CO_2$, and $H_2O$ was passed over powders of Cu/SAPO-34 catalyst produced by the one-pot synthesis of this invention and having four different contents of copper cations. The gas stream was passed over powder samples of the Cu/SAPO-34 catalysts at temperatures in the range from 150° C. to 600° C. (axis, 12), varied at fifty Celsius degrees differences. The curve with the open square data points was obtained with a Cu/SAPO-34 catalyst containing 10.09 weight percent copper. The curve with open circle data points was obtained with a Cu/SAPO-34 catalyst containing 8.95 weight % copper. The curve with open triangle data points was obtained with a Cu/SAPO-34 catalyst containing 4.23 weight % copper. And the curve with open star data points was obtained with a Cu/SAPO-34 catalyst containing 2.19 weight % copper. Each of the Cu/SAPO-34 catalysts was prepared by the subject one-pot method as described below in this specification.

The results of the testing of the Cu/SAPO-34-a, c, e, and g samples are presented in the graph of FIG. 3 as percent conversion of NO to $NH_3$, (vertical axis 10) versus temperature in degrees Celsius (horizontal axis 12). The curve with the open square data points was obtained with a Cu/SAPO-34-g catalyst containing 10.09 weight percent copper. The curve with open circle data points was obtained with Cu/SAPO-34-e catalyst containing 8.95 weight % copper. The curve with open triangle data points was obtained with Cu/SAPO-34 catalyst c containing 4.23 weight % copper. And the curve with open star data points was obtained with Cu/SAPO-34 catalyst a containing 2.19 weight % copper. Each of these copper-containing samples demonstrated activity for the conversion of nitric oxide to nitrogen using ammonia as the reductant at temperatures from about 150° C. to about 400° C. And it is seen that in these tests the Cu/SAPO-34 containing 8.95 weight percent copper was particularly active in the conversion of nitric oxide at synthetic exhaust gas temperatures as low as about 170° C. to 180° C.

As described above in this specification, previously the Cu-SAPO-34 materials have been produced by a multi-step synthesis in which a SAPO-34 material with ammonium cations is first made. Then the $NH_4$-SAPO-34 is subjected to ion-exchange with an aqueous solution of copper cations (a liquid phase ion exchange, LPIE, method) to obtain a Cu-SAPO-34 ion exchanged material. As described above in this specification, Cu-SAPO 34 materials by the LPIE method have been prepared for comparison with the subject materials synthesized by the subject one-pot process.

Figure 2:
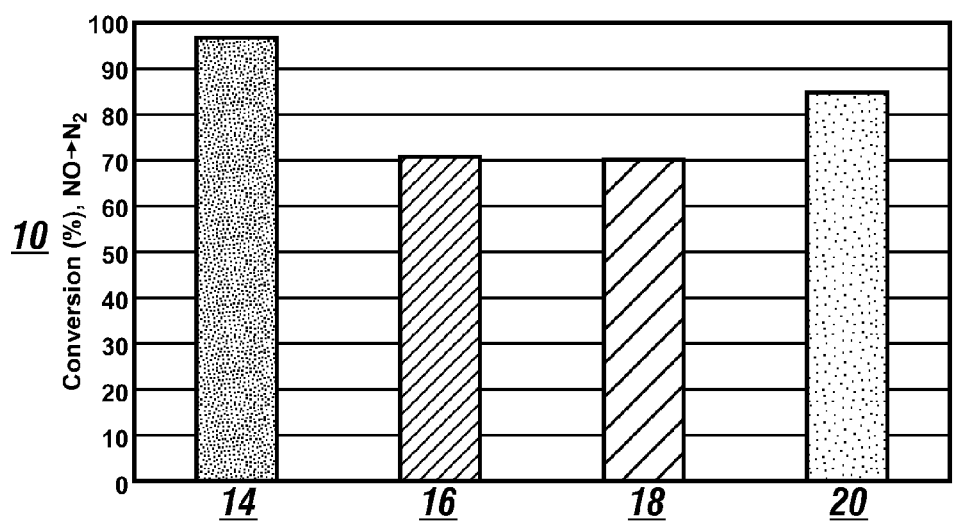
FIG. 2 is a bar graph of Conversion (%) of NO to $N_2$, axis 10, obtained by four different catalyst materials, using ammonia as the reductant, each catalyst material at a temperature of 175° C. Graph bar data 14 is the percent conversion of NO to $N_2$ obtained when a synthetic exhaust gas stream composed of NO, $NH_3$, $O_2$, $CO_2$, and $H_2O$ was passed over a powder of Cu/SAPO-34 catalyst produced by the one-pot synthesis of this invention. Bar data 16 is the percent conversion of NO to $N_2$ in the same gas stream composition using a powder of Cu-SAPO-34 catalyst produced by a liquid phase ion exchange method of inserting $Cu^{+2}$ cations in a H/SAPO-34 structure (LPIE). Bar data 18 presents the percent conversion of NO to $N_2$ in the same gas stream composition using the LPIE Cu-SAPO-34 material applied as a wash coat on the walls of a cordierite monolith catalyst support. And bar data 20 presents the percent conversion of NO to $N_2$ in the same gas stream composition using a commercial copper-based SCR catalyst with a SAPO-34 or SSZ-13 (CHA zeolite) support.

Such comparative tests were conducted using synthetic exhaust streams composed of 500 ppm NO, 500 ppm, $NH_3$, 5% $O_2$, 5% $CO_2$, 5% $H_2O$, and the balance nitrogen. FIG. 2 is a bar graph of Conversion (%) of NO to $N_2$, axis 10, obtained by four different catalyst materials, each at a temperature of 175° C. Graph bar data 14 is the percent conversion of NO to $N_2$ obtained in the above synthetic stream, passed over a powder of the Cu/SAPO-34-e catalyst (8.95 wt. % Cu) produced by the one-pot synthesis of this invention. Bar data 16 is the percent conversion of NO to $N_2$ in the same gas stream composition using a powder of Cu-SAPO-34 catalyst produced by a liquid phase ion exchange method of inserting $Cu^{+2}$ cations in a SAPO-34 structure (LPIE). Bar data 18 presents the percent conversion of NO to $N_2$ in the same gas stream composition using the LPIE Cu-SAPO-34 material applied as a wash coat on the walls of a cordierite monolith catalyst support. And bar data 20 presents the percent conversion of NO to $N_2$ in the same gas stream composition using a commercial SCR catalyst.

As the synthetic exhaust gas composition was passed in a continuous flow stream over the respective catalyst materials at a constant space velocity of about 35,000 $h^{-1}$, chemical analysis of the outlet gas stream by FTIR revealed that much of the NO in the inlet stream was converted to nitrogen and water by reaction with ammonia in the stream.

It is seen that the Cu/SAPO-34-e sample, prepared by the one-pot synthesis of this invention, performed very favorably in NO conversion with LPIE Cu-SAPO-34 material. The LIPE-produced Cu-SAPO-34 material also induced conversion of NO to nitrogen and water, but the amount of conversion was significantly less, particularly at exhaust gas temperatures 175° C. It is important that NO conversion catalysts display appreciable activity at relatively low exhaust gas temperatures as displayed in the above comparative tests.

Thus, the one-pot synthesis method of this invention provides an efficient practice and an effective practice for preparing Cu/SAPO-34. The silicoaluminophosphate can be synthesized in its SAPO-34 crystal structure and with copper cations ($Cu^{2+}$) contained within the framework of the crystal structure as it is formed. It is recognized the method of this invention saves processing time and materials in making a Cu/SAPO-34 and it enables the introduction of varying amounts of copper cations in the crystal structure as may be required in different catalyst applications or other applications needing different amounts of copper in the SAPO-34 structure.

It has been demonstrated that copper can be introduced into a SAPO-34 crystal structure in a one-pot synthesis by using complexes of a water dispersible copper salt with ethylene diamine or an oligomer of ethylene diamine. It is to be understood that this ethylene diamine complex forming practice may also be used in a like one pot synthesis to introduce metals such as manganese, iron, cobalt, and nickel, either alone or in combination with copper, to form a M-SAPO-34 crystal structure. It is recognized, for example, that Fe-SAPO-34 materials and Cu, Fe-SAPO-34 materials prepared by the ion-exchange of the metals with $NH_4$-SAPO-34 have also been used in the selective catalytic reduction of NOx with ammonia in automotive vehicle exhaust streams.

The invention claimed is:

1. A method of forming Cu/SAPO-34 comprising:
   forming an aqueous gel of $Al_2O_3$ or a $Al_2O_3$ precursor, $P_2O_5$ or a $P_2O_5$ precursor, and $SiO_2$ or a $SiO_2$ precursor;
   adding to the aqueous gel, or forming in the aqueous gel, a water soluble amine complex of copper in its +2 oxidation state and an equal molar amount of ethylene diamine or an oligomer of ethylene diamine, the copper being provided by a water soluble copper salt;
   stirring and aging the gel without heating;
   heating the gel to form a solid product; and
   calcining the solid product to form a crystalline product with SAPO-34 crystal structure containing copper +2 cations enclosed within the crystal structure.

2. A method of forming Cu/SAPO-34 as recited in claim 1 in which the copper salt is one or more of copper acetate, copper nitrate, and copper sulfate.

3. A method of forming Cu/SAPO-34 as recited in claim 1 in which one or more of ethylene diamine, diethylene triamine, triethylene tetraamine, and tetraethylene pentaamine are used in making the soluble amine complex with copper.

4. A method of forming Cu/SAPO-34 as recited in claim 1 in which the pH of the aqueous gel is adjusted, if necessary, to a value in the range of 7-9.

5. A method of forming Cu/SAPO-34 as recited in claim 4 in which propyl amine is added to the aqueous gel to adjust the pH of the gel to a value in the range of 7-9.

6. A method of forming Cu/SAPO-34 as recited in claim 1 in which the molar proportions of $Al_2O_3$ to $P_2O_5$ to $SiO_2$ in the aqueous gel are, respectively, about 1:1.14:0.57.

7. A method of forming Cu/SAPO-34 as recited in claim 1 in which the amount of copper cations in the Cu/SAPO-34 crystal structure is varied by varying the amount of the copper-amine complex stirred in the gel in proportion to the $Al_2O_3$.

8. A method of forming Cu/SAPO-34 as recited in claim 7 in which the amount of copper cations in the Cu/SAPO-34 crystal structure is varied by varying the amount of the copper-ethylene diamine complex within the range of from about 0.04 mole to about 0.571 mole of the complex per mole of alumina.

9. A method of forming Cu/SAPO-34 as recited in claim 1 in which the gel is stirred for a period of twelve hours or more.

10. A method of forming Cu/SAPO-34 as recited in claim 1 in which the gel is heated at a temperature of about 180° C. or higher for a period of twenty four hours or more.

11. A method of forming Cu/SAPO-34 comprising:
    forming an aqueous gel of $Al_2O_3$ or a $Al_2O_3$ precursor, $P_2O_5$ or a $P_2O_5$ precursor, and $SiO_2$ or a $SiO_2$ precursor, the molar proportions of $Al_2O_3/P_2O_5/SiO_2$ in the aqueous gel being about 1:1.14:0.57;
    adding to the aqueous gel, or forming within the aqueous gel, with stirring, a water soluble amine complex of copper in its +2 oxidation state and an equal molar amount of an oligomer of ethylene diamine, the copper being provided by a water soluble copper salt;
    stirring and aging the gel without heating;
    heating the gel to form a solid product; and
    calcining the solid product to form a crystalline product with SAPO-34 crystal structure containing copper +2 cations enclosed within the crystal structure.

12. A method of forming Cu/SAPO-34 as recited in claim 11 in which the copper salt is one or more of copper acetate, copper nitrate, and copper sulfate.

13. A method of forming Cu/SAPO-34 as recited in claim 11 in which the oligomer of ethylene diamine is one or more of diethylene triamine, triethylene tetraamine, and tetraethylene pentaamine.

14. A method of forming Cu/SAPO-34 as recited in claim 11 in which the pH of the aqueous gel is adjusted, if necessary, to a value in the range of 7-9.

15. A method of forming Cu/SAPO-34 as recited in claim 14 in which propyl amine is added to the aqueous gel to adjust the pH of the gel to a value in the range of 7-9.

16. A method of forming Cu/SAPO-34 as recited in claim 11 in which the amount of copper cations in the Cu/SAPO-34 crystal structure is varied by varying the amount of the copper-amine complex stirred into the gel in proportion to the $Al_2O_3$ moiety.

17. A method of forming Cu/SAPO-34 as recited in claim 16 in which the amount of copper cations in the Cu/SAPO-34 crystal structure is varied by varying the amount of the copper-ethylene diamine complex within the range of from about 0.040 mole to about 0.571 mole of the complex per mole of $Al_2O_3$.

18. A method of forming Cu/SAPO-34 as recited in claim 11 in which the gel is stirred for a period of twelve hours or more.

19. A method of forming Cu/SAPO-34 as recited in claim 11 in which the gel is heated at a temperature of about 180° C. or higher for a period of twenty four hours or more.

20. A method of forming Cu/SAPO-34 as recited in claim 11 in which the formed Cu/SAPO-34 is characterized by compositional molar proportions of 0.35-0.40 mole of silicon per mole of aluminum, 0.6-0.65 mole of phosphorus per mole of aluminum, and about 0.07-0.36 mole copper per mole of aluminum.

\* \* \* \* \*